United States Patent [19]

Vinton

[11] 4,120,515
[45] Oct. 17, 1978

[54] SUSPENSION SYSTEM FOR TANDEM AXLE VEHICLES

[75] Inventor: David S. Vinton, Morton, Ill.
[73] Assignee: Caterpillar Tractor Co., Peoria, Ill.
[21] Appl. No.: 787,816
[22] Filed: Apr. 15, 1977
[51] Int. Cl.² .............................................. B60G 5/02
[52] U.S. Cl. .................................................. 280/678
[58] Field of Search ............... 280/678, 677, 680, 681, 280/97

[56] References Cited

U.S. PATENT DOCUMENTS

| | | | |
|---|---|---|---|
| 2,827,282 | 3/1958 | Weiss | 280/702 |
| 3,297,339 | 1/1967 | Hendrickson | 280/681 |
| 3,493,243 | 2/1970 | Butler | 280/678 |
| 3,545,787 | 12/1970 | Miller | 280/687 |
| 3,685,853 | 8/1972 | Goldsmith | 280/81 R |
| 3,726,540 | 4/1973 | Gross | 280/677 |

FOREIGN PATENT DOCUMENTS 1,092,778 11/1960 Fed. Rep. of Germany ........... 280/678
1,455,569 4/1969 Fed. Rep. of Germany ............. 28/678

OTHER PUBLICATIONS

SAE Paper #740306, "Heavy Duty Truck Tandem Suspension for On/Off Highway Applications," Thomas A. Watson.

Primary Examiner—Joseph F. Peters, Jr.
Assistant Examiner—Donn McGiehan
Attorney, Agent, or Firm—James R. Bell

[57] ABSTRACT

A suspension system for tandem axle vehicles includes a crossbeam and a torque tube interconnecting speed anti-roll members. A resilient suspension member interconnects the crossbeam and the vehicle frame.

6 Claims, 3 Drawing Figures

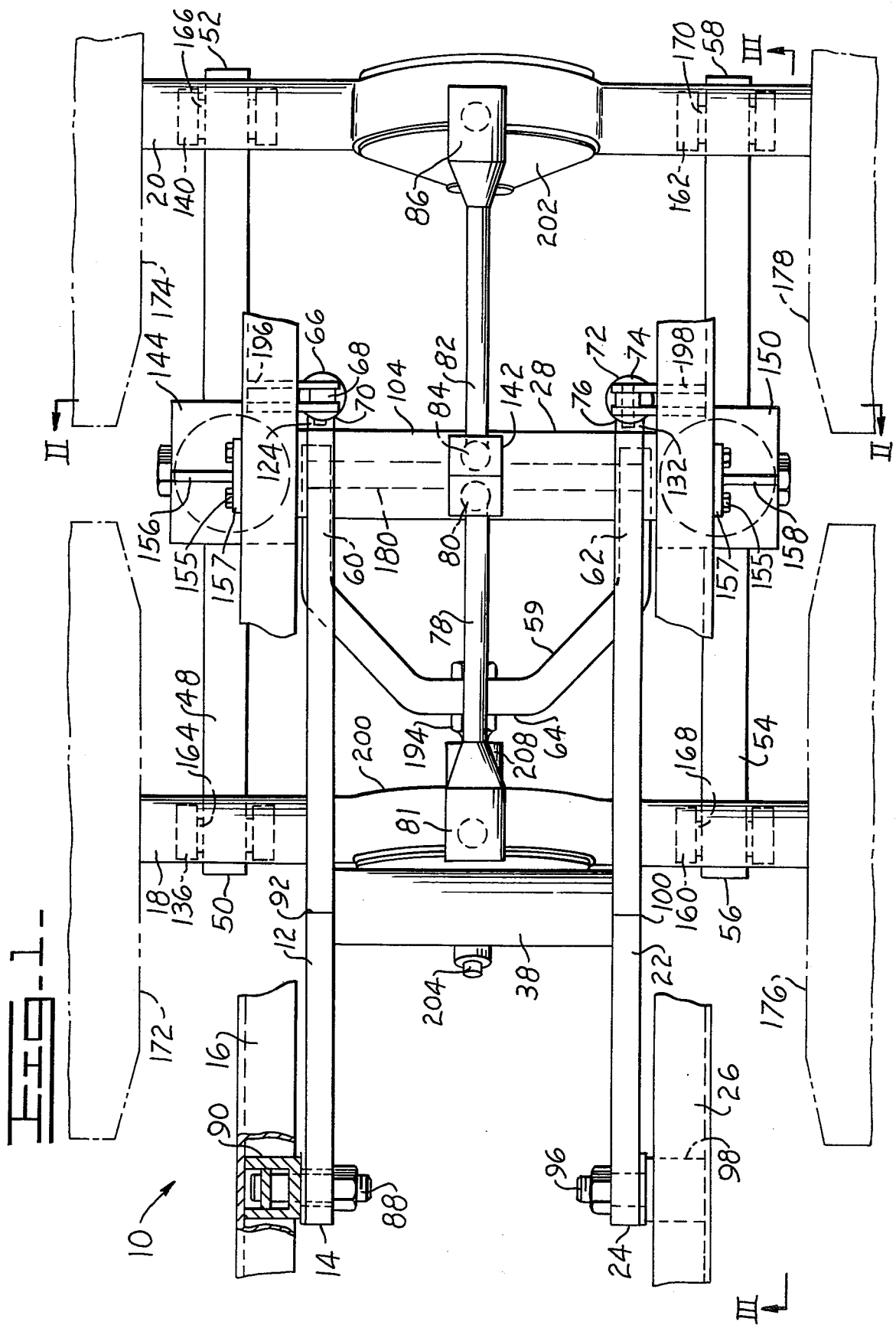

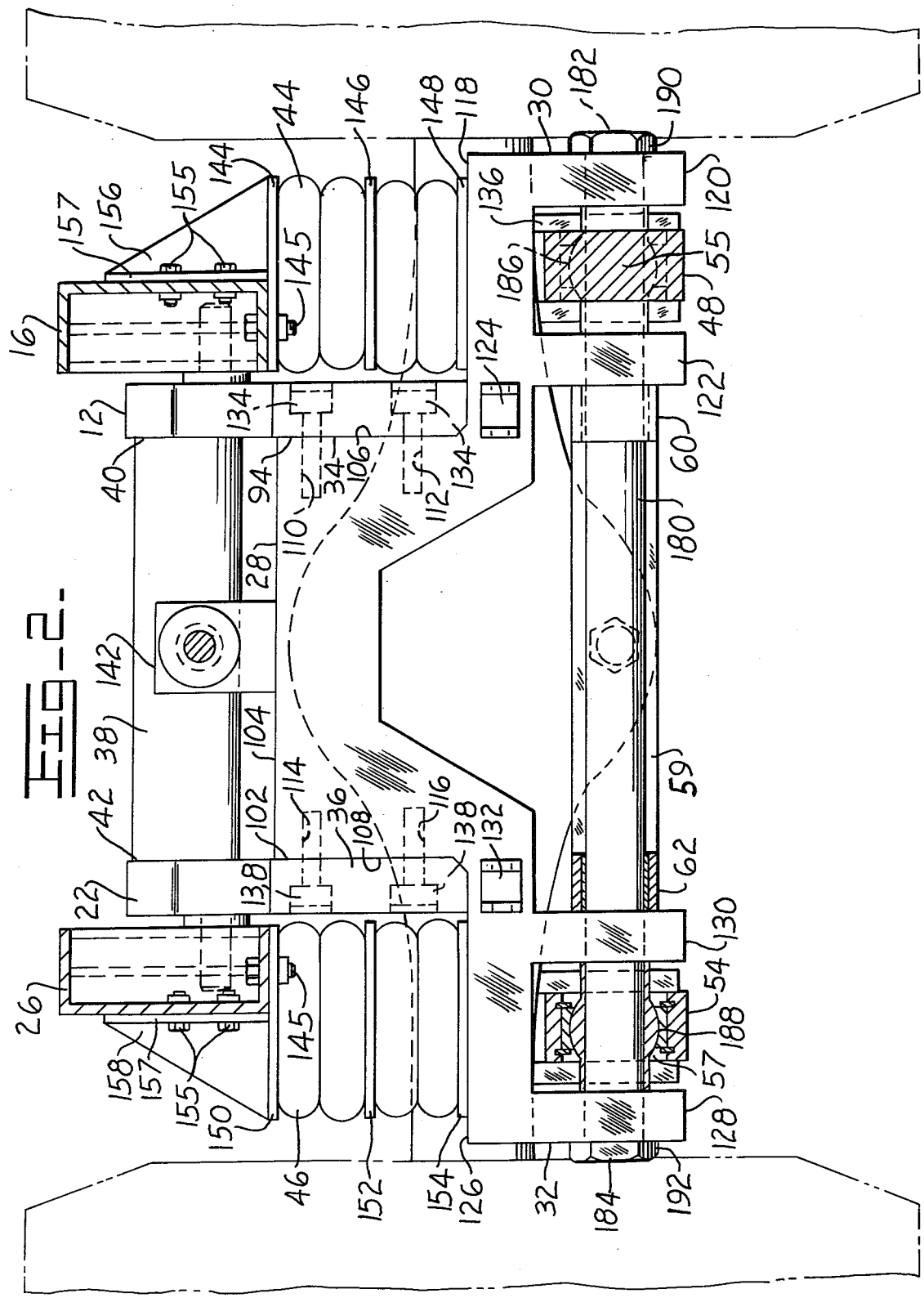

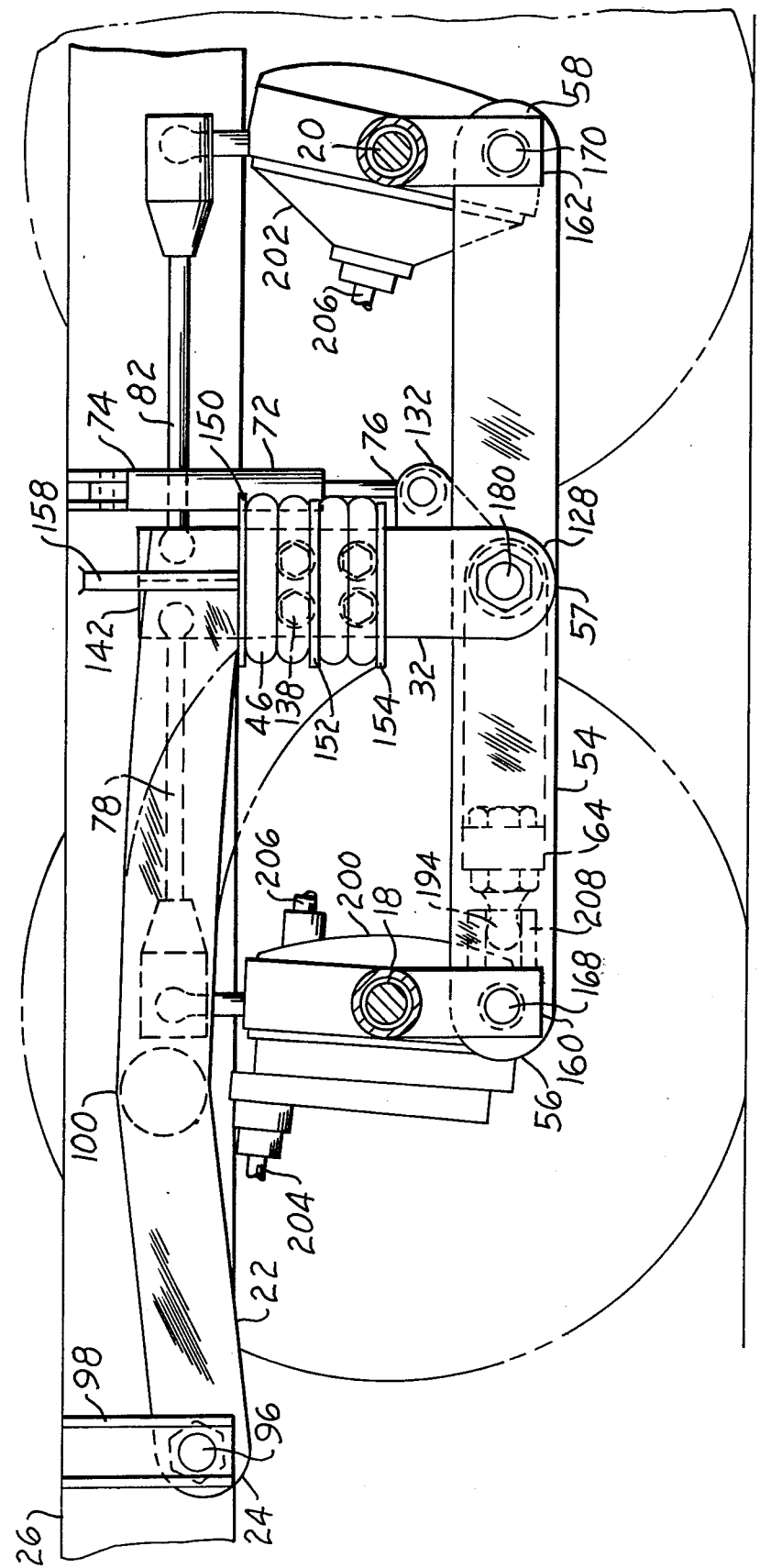

SUSPENSION SYSTEM FOR TANDEM AXLE VEHICLES

BACKGROUND OF THE INVENTION

1. Field of the Invention

This invention relates generally to land vehicles and more particularly to those of the wheeled type having tandem drive axles.

2. Description of the Prior Art

Presently, anti-roll devices are provided on vehicles with single drive axles and those devices have been combined with resilient suspension members to provide vertical cushioning. Anti-roll devices are also provided on tandem axles to provide some anti-roll stiffness but do not provide soft vertical cushioning for good ride characteristics or maintain equal tire loading. Insufficient anti-roll stiffness causes heavy duty vehicle tandem axles to have poor dynamic characteristics in turns. Such vehicles are generally of the class 8 type having high gross weight/high center of gravity characteristics and are primarily used for heavy hauling. Examples of such vehicles include ready mix, sanitation collection, coal haulers, construction, and the like.

In view of the above, it would be advantageous to provide a suspension system for heavy duty tandem axle vehicles having sufficient stiffness and anti-roll characteristics and also having vertical softness or cushioning for good ride characteristics without sacrificing axle load sharing, which overcomes the problems associated with the prior art.

SUMMARY OF THE INVENTION

The present invention is directed to overcoming one or more of the problems as set forth above.

According to the present invention this is accomplished by providing a suspension system for tandem axle vehicles including first and second spaced anti-roll members connected to the vehicle frame. A crossbeam and a torque tube interconnect the anti-roll members. At least one resilient suspension member interconnects the frame and the crossbeam.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is a plan view illustrating the suspension system of this invention;

FIG. 2 is an end view of the suspension system taken along the line II—II of FIG. 1; and FIG. 3 is a side view of the suspension system taken along line III—III of FIG. 1.

BRIEF DESCRIPTION OF THE PREFERRED EMBODIMENT

Referring now to the drawings, it can be seen in FIG. 1 that the suspension system of this invention is generally designated 10 and includes a first anti-roll member 12 pivotally connected at first end 14 to a portion 16 of the frame of a vehicle having tandem axles 18, 20. Second anti-roll member 22 is pivotally connected at first end 24 to another portion 26 of the vehicle frame and is spaced from first member 12. Crossbeam member 28, FIG. 2, is rigidly connected at its opposite ends 30, 32 to second ends 34, 36, respectively, of each of the spaced anti-roll members 12, 22. Torque tube 38 is rigidly connected at its opposite ends 40, 42 to first and second anti-roll members 12, 22, the rigid connection being between first and second ends of the anti-roll members, best shown in FIG. 1. Resilient member 44, FIG. 2, interconnects end 30 of crossbeam member 28 with frame portion 16 and resilient member 46 interconnects end 32 of the crossbeam member with frame portion 26. An equalizer beam 48, FIG. 1, is connected at its first end 50 to axle 18 and at its second end 52 to axle 20. Another equalizer beam 54 is spaced from beam 48 and is connected at its first end 56 to axle 18 and at its second end 58 to axle 20. Also, crossbeam 28 is pivotally connected at its opposite ends 30, 32 to equalizer beams 48, 54 at central points 55, 57, respectively thereof, see FIGS. 2 and 3. An A-frame support member 59, FIGS. 1 and 2, is pivotally connected at its first leg 60 to end 30 of crossbeam member 28 and at its second or opposite leg 62 to end 32 of the crossbeam member. The apex 64 of the A-frame member, FIGS. 1 and 3, is sliding ball connected to axle 18 but may alternatively be connected to axle 20. A first damping member 66, FIGS. 1 and 3, is connected at its first end 68 to frame portion 16 and at its opposite end 70 to end 30 of crossbeam member 28. Similarly, a second damping member 72 is connected at its first end 74 to frame portion 26 and at its opposite end 76 to end 32 of the crossbeam member. A first torque rod, FIG. 1, member 78 is connected at its first end 80 to crossbeam 28 and at its opposite second end 81 to axle 18, and similarly, a second torque rod member 82 is connected at its first end 84 to crossbeam 28 and at its opposite second end 86 to axle 20.

Anti-roll members 12, 22, FIGS. 1, 2 and 3, are substantially identical. Member 12 includes first end 14 preferably pivotally connected to frame portion 16 by a bolt 88 retaining a bearing or the like. A bolt-receiving attachment portion 90 is preferably secured to the channel-like frame portion 16 such as by welding or the like, for receiving bolt 88. The elongated, preferably fabricated steel, anti-roll member extends from first end 14 to dog leg 92 and then continues to downwardly extending "L" portion 94 and terminates at second end 34. Similarly, anti-roll member 22 includes first end 24 pivotally connected to frame portion 26 by bolt 96. Bolt-receiving attachment portion 98 is secured to frame portion 26 for receiving bolt 96. Anti-roll member 22 extends from first end 24 to dog leg 100 and then continues downwardly extending "L" portion 102 and terminates at second end 36.

Crossbeam 28, FIG. 2, is preferably of fabricated steel, and includes a main center portion 104 terminating at opposed sidewalls 106, 108. The first sidewall 106 includes bolt holes 110, 112 and the second sidewall includes bolt holes 114, 116. First sidewall terminates adjacent an extended portion 118 at first end 30. The extended portion includes downwardly extending, spaced flanges 120, 122. Also a tab 124 extends from crossbeam 28 in the direction of axle 20, as best shown in FIGS. 1 and 3. Similarly, second sidewall 108 terminates adjacent an extended portion 126 at second end 32, see FIG. 2. Extended portion 126 includes downwardly extending, spaced flanges 128, 130. Also tab 132 extends from crossbeam 28 in the direction of axle 20, FIG. 1. Bolts 134 secure "L" portion 94 to sidewall 106 and bolts 138 secure "L" portion 102 to sidewall 108, see FIG. 2. A flange 142 extends upwardly from center portion 104 for receiving first ends 80, 84 of torque rods 78, 82, respectively.

Torque tube 38, preferably a cylindrical rolled steel tube, is connected at its opposite ends 40, 42, preferably by welding, to spaced anti-roll members 12, 22 at or near dog legs 90, 100, respectively.

First resilient cushion member 44, FIG. 2, preferably of a suitable, relatively soft compressible rubber, or the like, is compressed between and bonded to, horizontal plates 144, 146, 148. Plate 144 is preferably attached to frame 16, such as by bolts 145, and plate 148 may be attached to extended portion 118 by welding. Plate is preferably provided between resilient portions of member 44 for stability. Similarly, second resilient member 46 is compressed between horizontal plates 150, 152, 154. Plate 150 is attached to frame 16, plate 154 is attached to extended portion 126 and plate 152 is provided between resilient portions of member 46. Plate 144 is reinforced by vertical plate 156 preferably including flange 157 bolted at 155 to frame portion 16 and plate 150 is reinforced by a similar vertical plate 158 having flange 157 bolted at 155 to frame portion 26, see FIGS. 1, 2 and 3.

Equalizer or walking beams 48, 54, FIGS. 1, 2 and 3, are well known and are preferably formed of a suitable forged steel or aluminum. First equalizer beam is pivotally connected, at first end 50, to axle 18 by pin 164 connected between downwardly extending axle flanges 136, and at second end 52, to axle 20 by pin 166 connected between similar flanges 140. Second equalizer beam 54 is pivotally connected, at first end 56, to axle 18 by pin 168 connected between downwardly extending axle flanges 160, and at second end 58, to axle 20 by pin 170 connected between similar flanges 162. Equalizer beam 48 extends between flanges 120, 122 of crossbeam 28 and equalizer beam 54 extends between flanges 128, 130. Thus, equalizer beam 48 is pivotally connected to axle 18 adjacent wheel 172, shown in phantom outline, and to axle 20 adjacent wheel 174. Similarly, equalizer beam 54 is pivotally connected to axle 18 adjacent wheel 176 and to axle 20 adjacent wheel 178.

A-frame support member 59, FIGS. 1 and 2, preferably of a suitable fabricated steel, is pivotally connected at its first leg 60 to crossbeam 28, and to equalizer beam 48 due to elongated shaft 180 extending therethrough. Similarly, second leg 62 is pivotally connected at second leg 62 to crossbeam 28 and to equalizer beam 54. Shaft 180 is threaded at opposite first and second ends 182, 184, respectively, and extends through flanges 120, 122, 128, 130, crossbeam 28 and through central points 55, 57 of equalizer beams 48, 54, respectively. A spherical bearing 186, FIG. 2, accomplishes the pivotal connection at equalizer beam 48 and, similarly, spherical bearing 188 accomplishes the pivotal connection at equalizer beam 54. Nuts 190, 192 secure shaft 180 at its opposite ends 182, 184. A ball type extension 194 is secured to apex 64 of support member 59, see FIGS. 1 and 3.

Vertical damper 66 is preferably resilient but relatively more stiff than resilient cushion member 44. Damper 66 is connected at its first end 68 to frame portion 16. Damper receptacle 196 is secured to extend from frame 16 to receive end 68 of damper 66, see FIGS. 1 and 3. Second end 70, of damper 66, is secured to tab 124 of crossbeam 28. Similarly, damper 72 is connected at its first end 74 to frame portion 26. Damper receptacle 198 is secured to extend from frame 26 to receive end 74 of damper 72. Second end 76, of damper 72, is secured to tab 132 of crossbeam 28.

Torque rod 78 is well known and preferably formed of a suitable steel. Rod 78 is ball and socket connected, at its first end 80, to flange 142 of crossbeam 28 and similarly ball and socket connected, at its second end 81, to axle housing 200 of axle 18. Similarly, torque rod 82 is ball and socket connected, at its first end 84, to flange 142 and, similarly, ball and socket connected, at its second end 86, to axle housing 202 of axle 20. Axle housing 200 is connected to a drive power source, not shown, by main drive shaft 204 and is connected to axle housing 202 by interconnecting drive shaft 206, partially shown in FIG. 3. Socket receptacle 208 is provided on housing 200 to receive ball type extension 194 of A-frame member 59.

In operation, anti-roll stiffness is provided to a vehicle due to anti-roll members 12, 22 interconnected by torque tube 38 and by crossbeam 28. The crossbeam is connected to the tandem axles due to the equalizer beams 48, 54 and the torque rods 78, 82. Also the crossbeam is additionally connected to at least one of the axles due to A-frame member 59. Vertical softness or cushioning is provided due to the provision of at least one, but preferably two resilient cushion members 44, 46 interconnecting the crossbeam with the vehicle frame and relatively stiff, vertical, resilient dampers 66, 72 are provided to compensate for the vertical cushioning of resilient members 44, 46.

The foregoing has described a suspension system for heavy duty tandem axle vehicles having sufficient stiffness and anti-roll characteristics and also having vertical softness or cushioning for good ride characteristics and maintaining axle load sharing capability.

The embodiments of the invention in which an exclusive property or privilege is claimed are defined as follows:

1. A suspension system for tandem axle vehicles including a vehicle frame, comprising:
    a first anti-roll member having a first end and being pivotally connected at the first end to one portion of the vehicle frame;
    a second anti-roll member having a first end and being spaced from the first anti-roll member and pivotally connected at the first end to another portion of the vehicle frame;
    a crossbeam member having opposite ends and being rigidly connected at each of said opposite ends to a respective second end of the spaced anti-roll members;
    torque tube means for limiting relative movement between the anti-roll members, said means having opposed ends and being connected at each of said opposed ends to a respective anti-roll member; and
    resilient suspension means for resiliently interconnecting the frame portions and the crossbeam member.

2. The suspension system of claim 1 wherein spaced equalizer beams have opposite ends connected to the tandem axles; and
    the crossbeam member is pivotally connected at opposite ends thereof to the spaced equalizer beams.

3. The suspension system of claim 1 further comprising:
    an A-frame support member pivotally connected, at its opposite legs, to the crossbeam member and sliding ball connected, at its apex, to one of the tandem axles.

4. The suspension system of claim 1, further comprising:
   damping means for interconnecting the frame portions and crossbeam member.

5. The suspension system of claim 1, further comprising:
   a first torque rod member interconnecting the crossbeam and one of the tandem axles; and
   a second torque rod member interconnecting the crossbeam and another of the tandem axles.

6. In a tandem axle vehicle having a suspension system including resilient suspension means, first and second spaced apart anti-roll members having first ends pivotally connected to a frame portion of the vehicle and second ends connected to a crossbeam, the improvement comprising:
   torque tube means for limiting relative movement between the anti-roll members, said means including an element having opposed ends and being rigidly connected at each of said opposed ends to a respective first and second anti-roll member.

* * * * *

UNITED STATES PATENT AND TRADEMARK OFFICE
CERTIFICATE OF CORRECTION

PATENT NO. : 4,120,515
DATED : October 17, 1978
INVENTOR(S) : David S. Vinton

It is certified that error appears in the above–identified patent and that said Letters Patent are hereby corrected as shown below:

[57] ABSTRACT:

line 2 - "speed" should be ---spaced---.

Signed and Sealed this

Eighth Day of May 1979

[SEAL]

Attest:

RUTH C. MASON
Attesting Officer

DONALD W. BANNER
Commissioner of Patents and Trademarks